Oct. 20, 1964   E. R. MARSH   3,153,775
TABLE LOOK-UP SYSTEM
Filed Feb. 11, 1959   7 Sheets-Sheet 2

RECORD CONTROL WORD

PROGRAM INSTRUCTION

TLU INSTRUCTION

DATA WORD

United States Patent Office 3,153,775
Patented Oct. 20, 1964

3,153,775
TABLE LOOK-UP SYSTEM
Elliott R. Marsh, Endicott, N.Y., assignor to International Business Machines Corporation, New York, N.Y., a corporation of New York
Filed Feb. 11, 1959, Ser. No. 792,661
2 Claims. (Cl. 340—172.5)

The invention relates to improvements in computers and, more specifically, to a unique system for performing table look-up operations.

An object of the invention resides in the provision of novel address incrementing means for a table look-up operation which enables the latter to be performed at speeds considerably faster than has heretofore been possible.

Another object resides in novel table look-up searching means for speeding up table searching by searching selected address locations under control of an address increment value.

Another object is the provision of flexible table look-up controls which enable a low search to be executed in a most expeditious manner.

Still another object lies in the provision of a flexible table look-up feature which provides novel means for finding the lowest table value during a table search.

Yet another object resides in searching a table constituted of individual tables, each identified by an associated Record Control Word which defines the limits of the table, and providing a unique system for the manipulation of the Record Control Words in searching operations.

Other objects of the invention will be pointed out in the following description and claims and illustrated in the accompanying drawings, which disclose, by way of examples, the principle of the invention and the best mode, which has been contemplated, of applying that principle.

Figure 1:
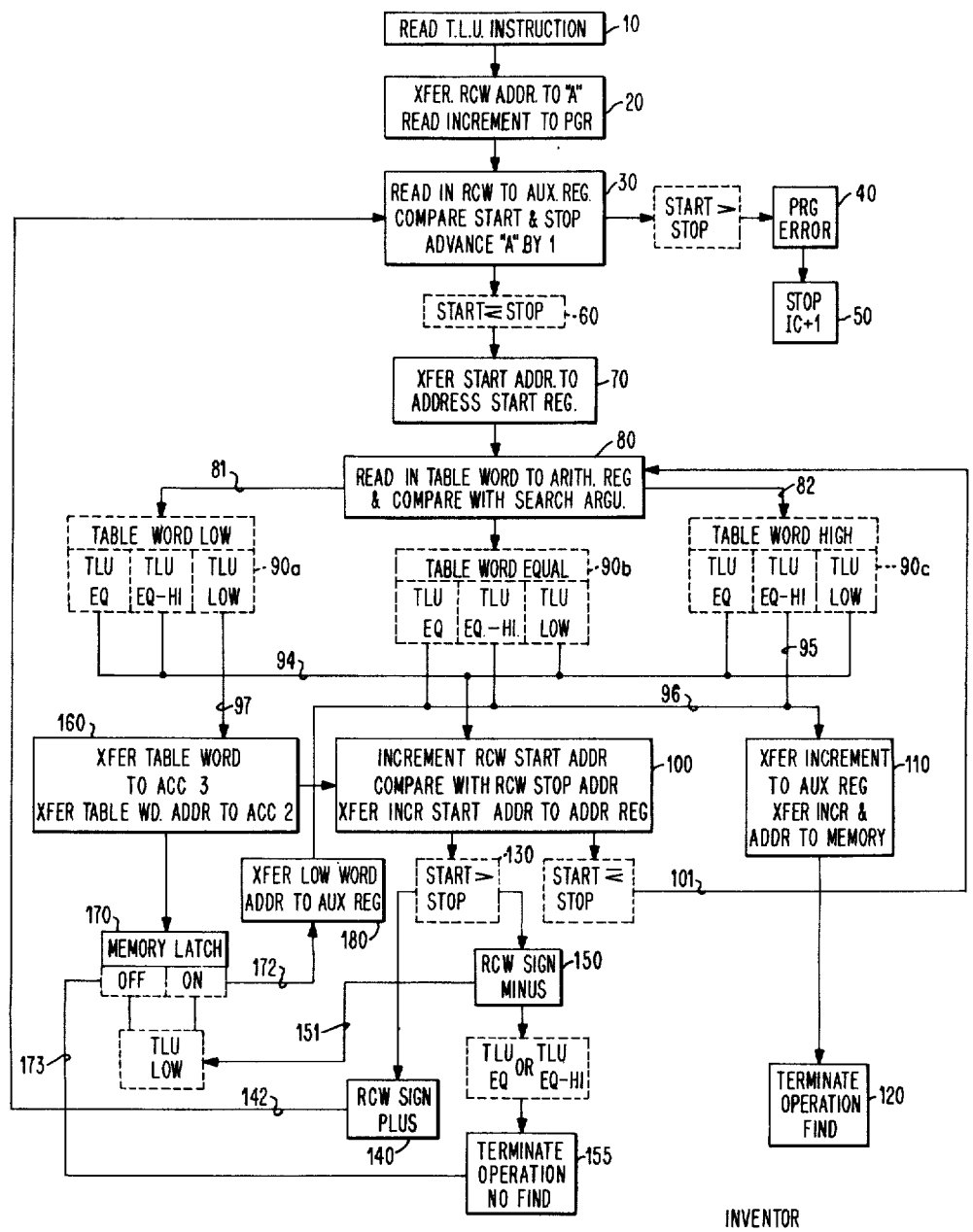
FIG. 1 is a schematic flow chart diagram of the invention explaining the principal features and controls for table look-up operations.

As a preliminary to an explanation of the table look-up operations, it may be advisable to explain generally the broad features and control functions of the computer in order to provide a basis for an explanation of table look-up operations.

A computer is basically comprised of an arithmetic section, program section, decision and logic controls, and a memory section. The various operations which the computer is capable of performing on data are directed under control of a program routine initially stored in the memory during a preliminary loading operation of the computer. The program routine is constituted of a multitude of program steps, each of which is initiated and directed under the control of an instruction word unique to each step or operation. During the course of a program step, data is either extracted from or transmitted to the memory section.

The data is processed in the arithmetic section of the computer comprised of various types of registers, accumulators, and an adder; the latter being capable of combining two words algebraically.

The decision and logic portion of the computer is adapted to make comparisons between data words, or between portions thereof, and the results of the comparisons are passed on to the decision-making devices which form a part of, or alter, the course of a program routine.

The data, as well as the instructions, are each constituted of a word of information. This information is generally comprised of ten digits plus a sign digit. Each digit is further represented in coded bit form; for example, two bits out of five bits in which the five bits of the code are weighted 6, 3, 2, 1 and 0.

The memory section is a large storage unit having extremely fast access time to enable it to provide data to the arithmetic and program sections as well as to a variety of concurrently operating peripheral units of the system; for example, input and output devices such as card feeding units, punches, printers, tape transport units.

In order for the various units to be operated in the most efficient manner, appropriate sections of the memory must therefore be reserved for each unit; the program section, the arithmetic section, etc.

Each data or instruction word location in the memory has a unique address. For a 10,000 word memory, the addresses would range from 0000 to 9999. A group of consecutively arranged address locations are referred to as a "block." Each block has associated therewith a block identification word which will hereinafter be referred to as a "Record Control Word" (RCW) which defines the starting and ending addresses of the block by means of appropriate start and stop addresses. Blocks of data locations may vary in size depending upon the defining addresses in the record control word.

It may now be appropriate to describe the various components of the system and the purpose of each such component. These include the adder, arithmetic register, the address register, the program register, accumulators, comparing means, the memory, the means for generating the various timing pulses and gate signals, and among the controls, a table look-up control ring.

The main core adder 190 is a serial core adder adapted to provide the algebraic sum of two words of data entered respectively by way of entry A, means 190a, entry B, and through complement control means 190b. Digital information is fed into entry A by way of channel 1 while digital information is fed into entry B by way of channel 2. These channels are each constituted of five lines over which the 2-out-of-5 coded data is transmitted (serially by digit and parallelly by bit). Data is thus entered into the adder parallelly by bit and serially by digit. The adder is attached with comparing output lines 191 and 192 in turn connected to a comparing unit 90 capable of yielding one of three outputs; namely, high, equal, or low, respectively referenced 193, 194 and 195. The algebraic sum of the information fed into the adder is issued over adder output line 196 in turn connected to adder output line 197. The information is thus issued serially by digit and parallelly by bit.

The arithmetic register 80 has a capacity of a full word of data. It is adapted to accept data parallelly from the information bus 210 and transmit the same to an arithmetic bus 212. During table look-up operations, the arithmetic register is employed to store the table values.

The address register 70 is a 4-position register adapted to communicate with the arithmetic bus 212 and a computer address bus 211. During table look-up, it accepts the record control word start address and transmits the same to memory address register 1 which in turn requests from the memory the contents specified by the address.

The program register 10 is comprised of eleven positions divided up as follows:

Three positions; namely, S, 0 and 1 for storing the sign and the operation code of an instruction. These three positions constitute the operation register, Two positions; namely, 2 and 3 for storing the indexing word of an instruction, Two positions; namely, 4 and 5 for control purposes, and Four positions; namely, 6, 7, 8 and 9 for storing the last four positions of an instruction. These four positions are usually referred to as the program D register which is referenced 100. The principal function of the program D register during the table look-up operations is to store the increment value for incrementing the record control start address stored in the auxiliary register.

The accumulators are of the serial parallel type; i.e., they are capable of admitting and issuing data serially with left or right shift and also capable of admitting or issuing data in parallel. Accumulator #2, 160', is employed during table look-up low operations to store the address of the low table word. Accumulator #3, 161, is employed to store the search argument.

The auxiliary register 30 is divided up into sections 30a of two positions, 30b of four positions, and 30c of four positions. The portion 30b is usually designated to hold the start address of the record control word and the portion 30c is designated to hold the stop address of the same record control word. The auxiliary register communicates with the information bus 210 from which it accepts the record control word start and stop addresses. The auxiliary register also communicates with the arithmetic bus 212 to which it transmits the record control word start addresses and the incremented addresses.

The memory 1 is a storage unit having a capacity of 10,000 words, each having a unique address. The addresses range from 0000 for the first address to 9999 for the last address. The memory contains, among other things, the program routine, the various tables, the increment value, the record control words, as well as other stored data. This information is usually entered into the memory on a preliminary or an initial loading operation prior to the actual table look-up operations. The memory has a 6-microsecond cycle for read-in and readout operations. During read out, the information is regenerated to provide what is known as nondestructive read out. The read in of information, however, effaces the original contents. The data information in the memory is issued in response to a memory request. The latter is generated from the arithmetic and program sections, as well as from external peripheral devices, whenever access is requested of the memory. Whenever the memory becomes available, the request is honored at the appropriate time in the cycle. The contents of a particular word location in memory is selected under control of the memory address register and storage selection means 2, which register communicates its address selection information by way of bus 3 to the memory. The address information is fed into the memory address register and storage selection means 2 by way of the computer address bus 211.

The generation of the various timing pulses and signals of the system is under control of a memory clock 200 and a computer arithmetic clock 201. The former issues six pulses; namely, UP, VP, WP, XP, YP and ZP, each of a microsecond duration. The computer arithmetic clock 201 issues pulses identified as AP, BP, CP and DP, each of a microsecond duration. The two clocks are synchronized in their operations under control of a synchronizer 202.

Figure 8:
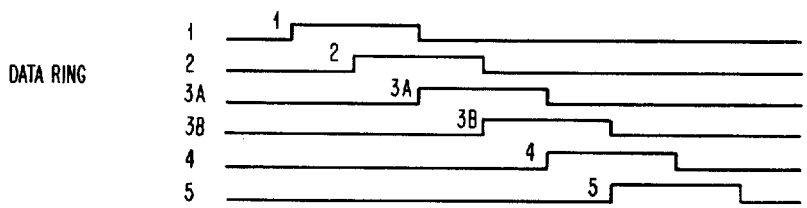
FIG. 8 is a time chart showing timing relationships for the program clock pulses, computer clock pulses, memory readout and read-in intervals, and control signals issued by the data ring.
Figure 6:
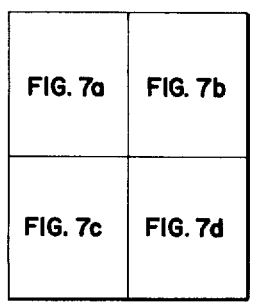
FIG. 6 is a block diagram showing how

Memory read-in and readout operations are time controlled by combinations of memory clock pulses and computer clock pulses. These combinations of pulses generate a memory read-in signal (MRI) 5 and a memory readout signal (MRO) 6. The relationship of the memory read-in and readout cycles to other timing signals may be seen in the chart of FIG. 8.

The functions controlled by the table look-up control ring 17, shown in FIG. 7c, may be generally summed up as follows. The table look-up control gate A signal 22 controls, among other things, the transfer of the increment from the memory to the program register 100 and the transfer of the record control word address from the program register 100 to the address A register 102.

The transfer control 2 gate signal 23 enables the transfer of the record control word from the memory to the auxiliary register, the sign of the record control word to the sign register, and advancing the record control word 2 address in the A register 102. In addition, this control enables the comparison of the record control word start address and the record control word stop address.

Table look-up control gate B signal 24 provides for the extraction of the table values from the memory to the arithmetic register and provides for the comparison of the table value with the search argument.

Table look-up control C signal 25 controls the incrementing operation and the comparison of the incremented address with the record control word stop address. In addition, it controls the termination of the "no find" operation.

Table look-up control gate D signal 27 controls the termination of all "find" operations.

Before proceeding with a general explanation of table look-up operations, it might be appropriate at this point to explain the various instruction formats used to control various systems operations and the table look-up (TLU) operations. These instructions include a record control word (RCW), a program instruction, a table instruction, and a data word.

Figure 2:
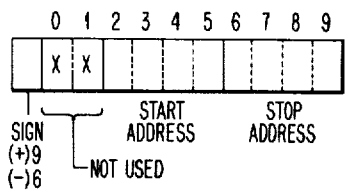
FIGS. 2, 3, 4 and 5 show, respectively, the format composition for a Record Control Word, a program instruction, a table look-up (TLU) instruction, and a data word.

Referring to FIG. 2, the record control word is an 11-digit word, the positions thereof reading from left to right being sign, 0–9, inclusive. The sign position may have either a plus, represented by a 9, or a minus, represented by a 6. Positions 0 and 1 are not used. Positions 2–5, inclusive, specify the address of the start location in the memory where a data word is to read into or read out of. Positions 6–9, inclusive, specify the address of the stop location of the word in the block of words in the memory.

Figure 3:
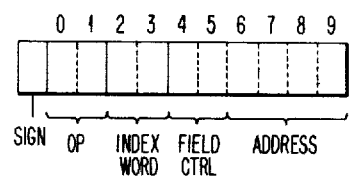

The program instruction, as seen in FIG. 3, is an 11-digit word containing a sign; a 2-digit operation code, positions 0–1; a 2-digit index word address, positions 2 and 3; a 2-digit word control, positions 4 and 5; and a 4-digit address, positions 6–9, inclusive. The word control in positions 4 and 5 is used to define field length or size of a word, as well as other control information, depending upon the nature of the operation code. The 4-digit address generally specifies the operation of an operand or some other word of instruction.

Figure 4:
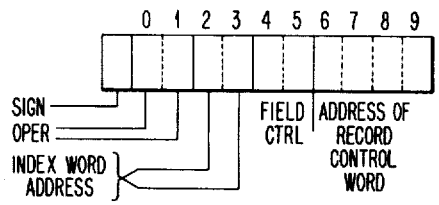

The table look-up (TLU) instruction format, shown in FIG. 4, is an 11-digit word containing signal and operation code, positions 0–1; a 2-digit index word, positions 2 and 3; two digits of field control information in positions 4 and 5; and, finally, a 4-digit address, positions 6–9, inclusive, which specifies the address of a record control word in storage or memory.

Figure 5:
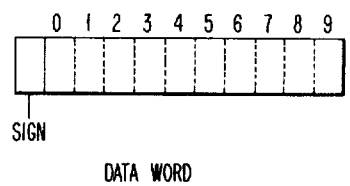

The data word format in FIG. 5 is comprised of ten digits plus sign. These ten digits generally represent a 10-digit operand.

The data information and the instruction information processed through the system are represented in 2-outof-5 code form constituted according to the table shown below:

| DECIMAL VALUES | BIT VALUES | | | | |
|---|---|---|---|---|---|
| | 6 | 3 | 2 | 1 | 0 |
| 0 | | | | | |
| 1 | | | | X | |
| 2 | | | | X | X |
| 3 | | | | X | X | X |
| 4 | | | X | | X |
| 5 | | X | X | X | |
| 6 | | X | X | | |
| 7 | X | | | | X |
| 8 | X | | | X | |
| 9 | X | | X | | |
| | X | X | X | | |

The data and instruction information are transmitted through the computer system by means of various flow paths and busses, shown in FIGS. 1a and 1b. One such bus is identified as an INFORMATION bus 210 comprised of 55 lines over which a single word of eleven digits, including sign, is transmitted in parallel in a single memory, or storage cycle. Another bus identified as a COMPUTER ADDRESS bus (CAB) 211 is comprised of 20 lines over which a lesser number of characters, each comprising a 4-digit address, are transmitted in parallel. An ARITHMETIC bus (AB) 212 is likewise comprised of 55 lines and over which information may be transmitted in parallel a word at a time. Single lines, except where specific mention is made thereof, generally are used to transmit control signals, timing signals, and gates.

A general explanation of the table look-up operations will now be given in connection with FIG. 1. Prior to the transmission of a table look-up instruction, an appropriate instruction is fed to the program calling for the entry of the search argument into a register (accumulator #3). Following the entry of the search argument into the register, the explanation may now proceed with the reading of the table look-up instruction upon receipt of the same by the program. This table look-up instruction calls for obtaining the address location of a table value which is either high or equal to the value of the search argument in the register. Referring to FIG. 1, block 10 calls for reading in the table look-up instruction into the program. In response to an analysis of the table look-up instruction, an increment value is read out of the memory (which value was originally entered in the memory during an initial computer loading operation). The increment value will be used, in a manner to be more fully explained later on, throughout the table look-up search operation to cause selection of the table locations that are not in consecutive adjacent locations. This is made possible, as will be explained, by the fact that the increment value, when called upon, is used to increment each address location presented to the memory. In block 20 of FIG. 1, the operation that follows concerns the transfer of the address of the first record control word, in positions 6–9 of the instruction, to an address control register A, and thereafter instructing the memory to read out succeeding record control words according to the requirements of the table look-up operation. Referring to block 30, in FIG. 1, the operation step involved here calls for reading in the first record control word to an auxiliary register. The record control word, which contains a start and stop address of an associated block of table words or values, is transmitted to the auxiliary register at an appropriate time in the operation. The start and stop addresses will then be compared to see that the start address is lower than the stop address, and the A register containing the address of the first record control word is incremented by "one." If the start address is found to be higher than the stop address, a program error, block 40, will be signaled to cause the issuance of a program error and cause the machine to stop.

Should the comparison of the start and stop addresses of the record control word yield a comparison that is low or equal, indicated by block 60, table look-up operations will then proceed to block 70 which calls for the transfer of the record control word start address from the auxiliary register to an address start register, the latter thereupon instructing the memory to issue the first table word from the location specified by the record control word start address. The table word is then issued, as indicated in block 80, to an arithmetic register. Thereafter, the table word is then compared against the search argument, and the course of the table look-up will be determined by the results of the comparison, which may be any one of the three possible conditions; namely, high, equal, or low. If the comparison yields a low, and considering the fact that the search is directed to the location of a high or equal table value, the chart of FIG. 1 then shows the control to shift to block 90a and thence along line 94 to block 100, which specifies the next step in the operation to be one in which the record control word start address will be incremented by the value specified in the increment. Following the incrementing step, the new incremented address value will be compared with the record control word stop address and, if this comparison yields a low, the incremented address value is transferred to the address register which instructs the memory to issue the next table value which will be selected from the address location specified by the new incremented address. At this point, it is to be emphasized that the increment may be any value from 0001 to anything below 9900. Thus, the increment may be 0002, 0003 . . . 0010, etc. The value of the increment, therefore, determines, after the first table value, how many consecutive address locations are skipped over in the table before the next addressed table value is selected for comparison with the search argument.

Following the comparison of the second table value with the search argument, the incremented address is again incremented provided, however, the comparison yielded low. This operation is repeated, under control of line 101, as many times as a low comparison is found. Eventually, however, the table look-up will terminate with either a "find" or a "no find"; the "find" meaning that a table value was found and the "no find" meaning that a table value was not found.

The conditions surrounding a "find" are as follows. The occurrence of a high or equal comparing result yielded in response to a comparison between the last incremented table value and the search argument directs the control from block 80, along line 82, through block 90c, along lines 95 and 96 to a block 110 which calls for transferring all but positions 2–5 of the increment word from the memory to the auxiliary register. This step is necessary to form a word in the auxiliary register consisting of the original increment word but with the "find" address replacing the numbers in positions 2–5. This new word is then restored in the address of the original increment word. Termination of the table look-up is then effected in block 120.

As one of the features of the invention, a table look-up search may be performed on a table constituted of a plurality of tables scattered in the memory. This operation proceeds in the manner described up to the point where a comparison has been made between the incremented record control word start address and the associated record control word stop address in the block 100. Considering that the same type of search to be in progress as previously indicated, should the comparison at block 100 yield a high result and thus indicating the fact that the incremented record control word start address is greater than the associated record control word stop address, as indicated by block 130, the table look-up operation then proceeds to interrogate the sign of the current record control word. If the interrogation indicates the sign to be plus, the table look-up operation proceeds to extract from memory the next record control word. On the other hand, had the interrogation revealed a minus sign, the operation would have terminated as a "no find" under control of block 155.

Assuming that the record control word sign was found to be plus, the table look-up operation proceeds under control of block 140, line 142, to block 30 which calls for reading out the next record control word from memory to the auxiliary register, comparing the record control word start and stop addresses, and thereafter advancing the address contained in the address register A by "one" in order to provide the address location for the third record control word should ensuing operations require such a third record control word. The operation from this point on proceeds in the manner previously described from block 30; and, should the comparison of the incremented record control word start address and the associated record control word stop address yield either an equal or a low, the operation proceeds under control of the line 101 as previously described. As the table look-up operation continues without a "find" and the interrogation of the current record control word reveals it to be minus, as determined by block 150, the table look-up operation is terminated.

One of the more important features of the invention concerns a table look-up low. In this type of a search, the operation is set up so as to find the lowest table value. In searching for the lowest value of the table, the operation is initiated with an appropriate table look-up instruction and the search then proceeds in the manner described to the point where the first low is encountered. A memory latch block 170 will be turned on to indicate this low "find." The low "find" operation is performed in the block 90*a* from which block the control proceeds along a line 97 to block 160 which calls for transferring the low table word, which is in the arithmetic register, to accumulator register #3 whereby the initial search argument is replaced by the low table word. Also during this operation, the address location of this low table word is entered into accumulator register #2, the above operations being repeated each time a new low table value is found. Should the table be constituted of individual tables scattered throughout the memory with each such table having an appropriate identifying record control word, the latter would be processed in the manner described. Upon completion of the searching of the entire table, the operation will be terminated as follows.

Assuming that the memory latch 170 was turned on during the course of the search, the control of operation proceeds from the block 170 through line 172 to a block 180 which calls for transferring the found address, now in accumulator #2, to the auxiliary register. Thereafter, the control proceeds over the line 96 to the block 110 which calls for transferring the contents of the auxiliary register, which now includes the last address of the lowest table value found, to the memory in the manner previously described.

If the search did not yield a single low, the operation would terminate by way of block 130, 150, line 151, block 170 memory latch off, line 173, to the block 155.

Figure 7A:
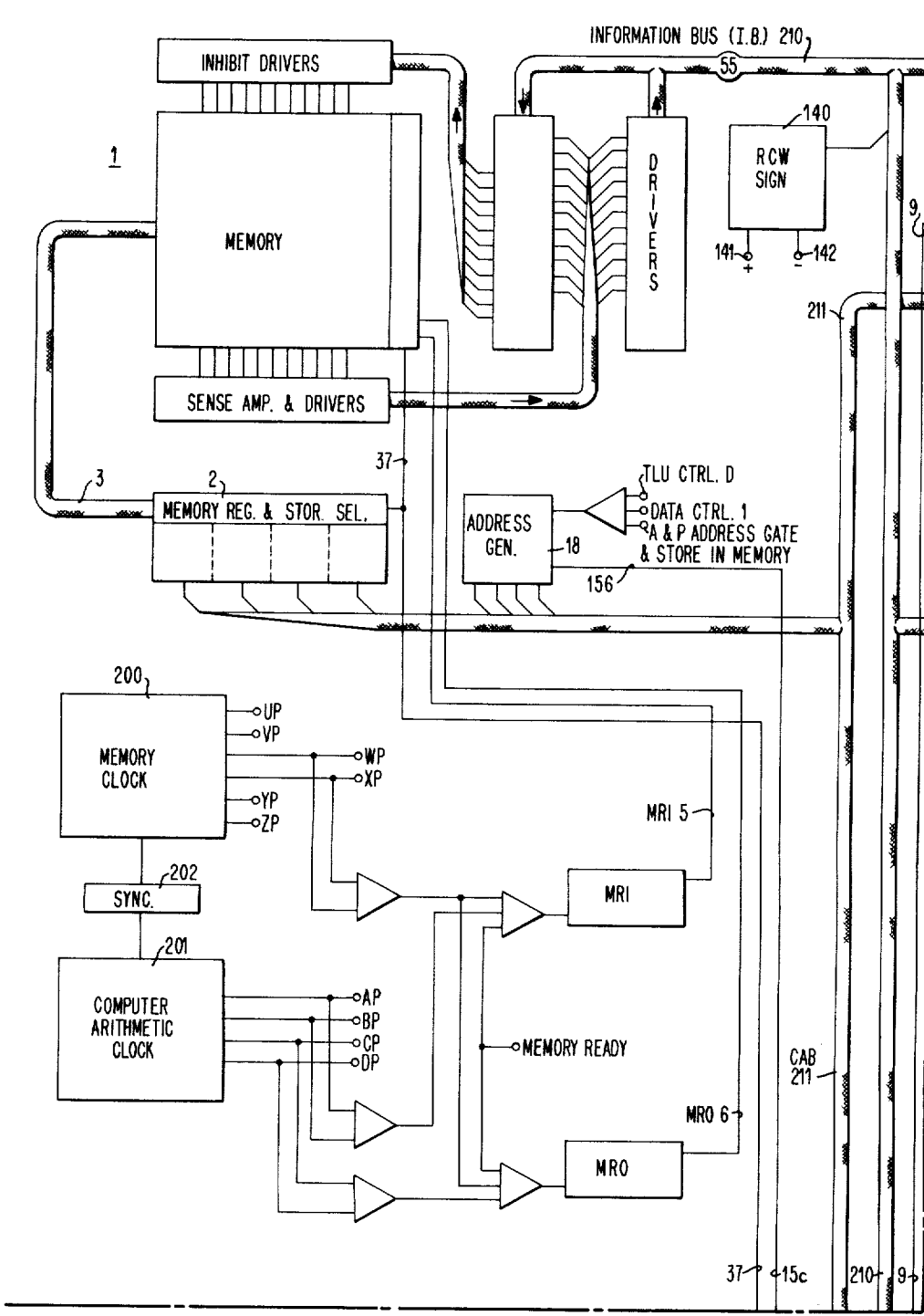
FIGS. 7a–7d are arranged to form a composite circuit diagram of the invention.
Figure 7B:
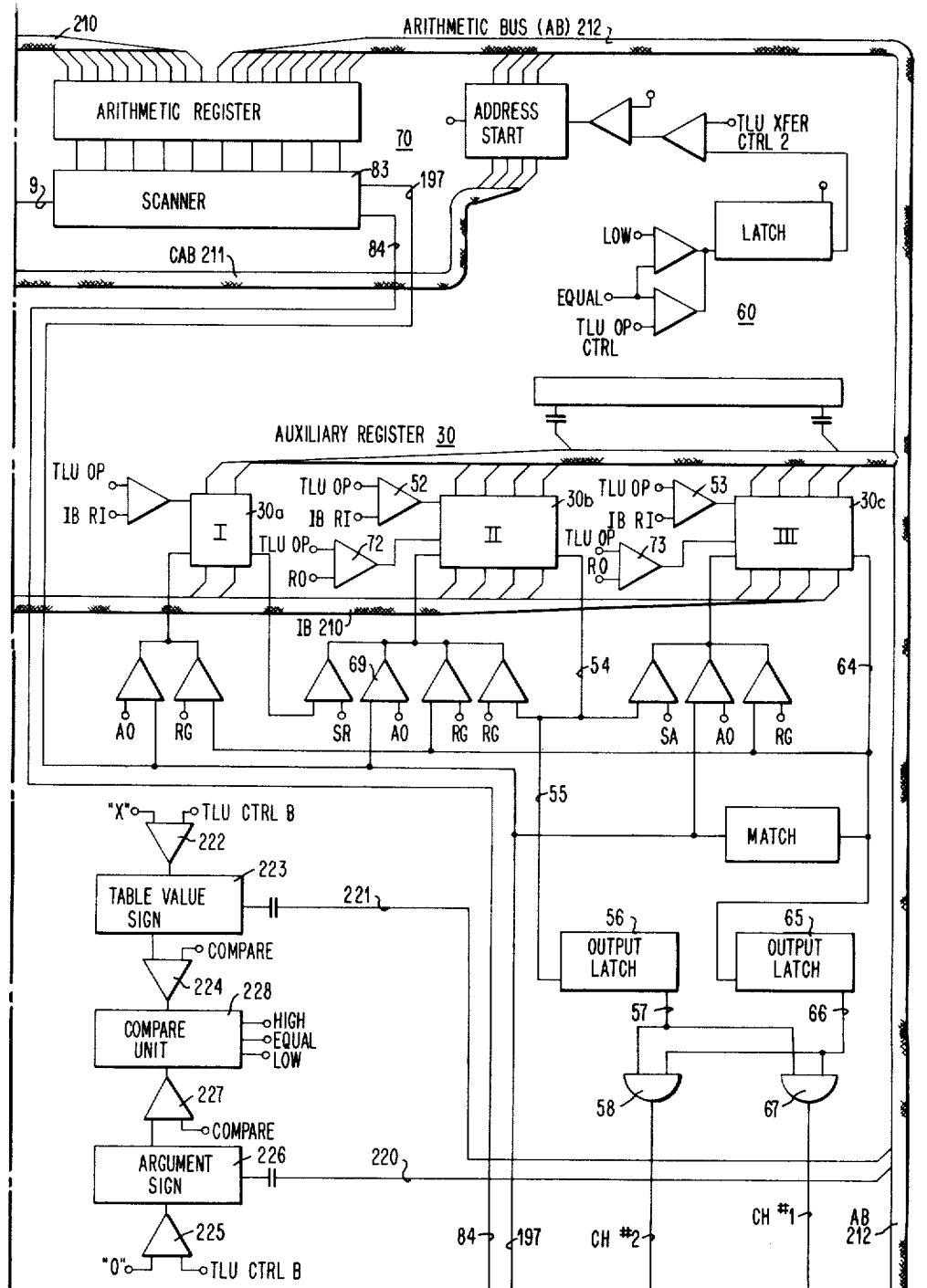
Figure 7C:
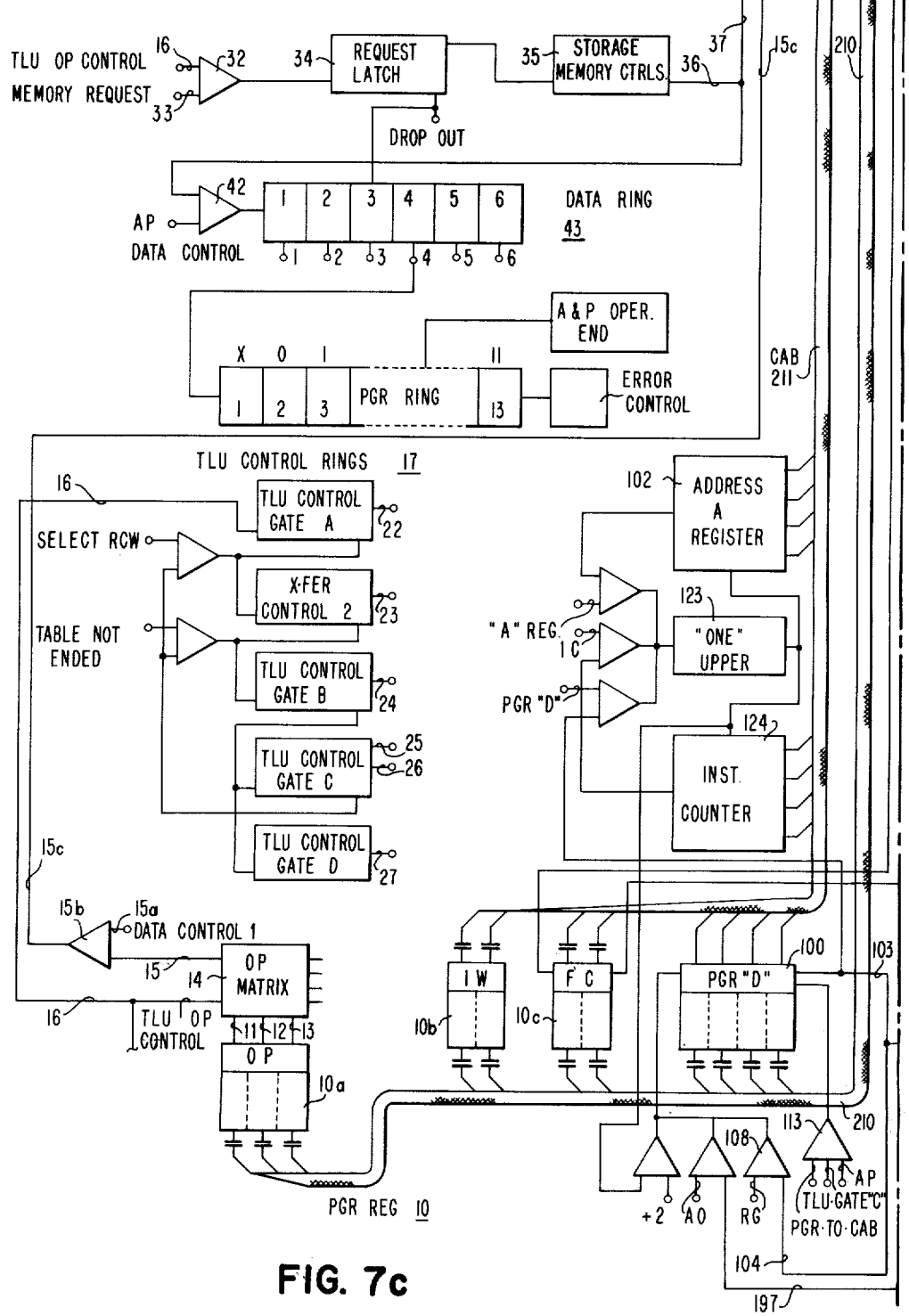

Referring to FIGS. 7*a*–7*d*, a more detailed description of a table look-up operation will now be described in connection with a high-equal search. Assuming that all preliminary loading operations have been previously performed and that the search argument is now stored in accumulator #3, 160, the operation may now proceed from the point where a table look-up instruction is encountered in the routine and transmitted to the program register 10. This instruction will have in its first three positions the operation code plus 68, which will initiate a high-equal search operation. This instruction is directed from the memory 1, in FIG. 7*a*, through the information bus 210 to the program register 10, in FIG. 7*c*. The last four positions of the instruction contain the address of the first record control word in the memory, which word defines the starting and ending limits of the table to be searched. These four address positions are entered into the program D register 100. The operation code of the instruction is fed into the OP register 10*a*. The latter has connections 10, 11 and 13 to an operation (OP) matrix 14 which provides, upon the analysis of the operation code of the instruction, the necessary computer controls to carry out the table look-up operation. The matrix 14 is generally of the type described in a copending Hamilton et al. application filed November 2, 1955, Serial No. 544,520, and assigned to the common assignee. The analysis of the operation code plus 68 provides control signals that enable the transmission of the record control word address from the program D register 100 to the computer address bus 211 and then from the latter to the address A register 102. Among the control signals issued by the operation matrix is a table look-up operation control signal (TLU OP CTRL) 16 which will initiate operation of a table look-up control ring 17 which, in response to comparisons yielded during the ensuing table look-up operation, thus directs the course of the table look-up operation. This ring 17 provides a TLU CTRL gate signal 22, a TRANS CTRL 2 signal 23, a TLU CTRL B signal 24, a TLU CTRL C signal 25, and a TLU CTRL D signal 26. Controls associated with extracting the increment from the memory 1 are initiated immediately after a memory request is honored by the memory controls and this is achieved as follows. Referring to FIG. 7*a*, a switch 32 is rendered effective upon the coincidence of two input signals; namely, the TLU OP CTRL signal 16 and a memory request signal 33. The output of the switch 32 turns on a memory request latch 34 which, in turn, sets up appropriate memory control means in a storage memory control unit 35. The latter, accordingly, issues a control on lines 36 and 37. The signal to line 36 is gated with an A pulse at a switch 42. The latter, in turn, turns on data ring 43 provided with six stages. This ring provides data control signals 1–6 each having the timing shown in the chart of FIG. 8. Another control set up by the operation matrix 14 for extracting the increment value follows along a line 15, in FIG. 7*c*, which is gated with a data control 1 signal 15*a* at a switch 15*b* which provides an output on line 15*c* connected to an address generator 18, shown in FIG. 7*a*, wherein the address 0098 will be generated.

In response to the above controls, the memory 1, accordingly, issues the increment contents of location 0098 upon the information bus 210 and then to the program D register 100. Also, the address of the record control word contained in the address A register 102, in FIG. 7*c*, is transmitted to the computer address bus 211 and from the latter to the memory register and storage selection means 2. The latter, at the appropriate memory cycle, causes the memory to issue the record control word to the information bus 210 and from there to the auxiliary register 30. The contents of this record control word are constituted of the start address, which is entered into auxiliary register 30*b*, and the stop address, which is entered into the auxiliary register 30*c*. This entry operation is controlled by means of switches 52 and 53. The comparing operation follows whereby the record control word start and stop addresses are compared, and this is effected as follows. The start address is transmitted serially from the auxiliary register 30*b* to adder entry B, 190*b*, by way of the auxiliary register output line 54, line 55, output latch 56, line 57, mix 58, channel 2, entry B, 190*b*, to the adder 190. The stop address is transmitted from auxiliary register 30*c* to entry A, 190*a*, by way of auxiliary register output line 64, output latch 65, line 66, mix 67, channel 1, to the adder entry A, 190*a*, the outputs from the adder 190 are fed by way of the lines 191 and 192 to the comparing unit 30*a*, the latter being capable of yielding one of the three outputs; namely, high, equal, low. If the output is high at this time, a switch 40*a* will be rendered effective to turn on appropriate error controls in the block 40. However, if the output is low, indicating that the record control word start address is less than the associated stop address, the controls will cause the record control word start address to be transmitted from the auxiliary register 30b to the arithmetic bus 212 and then to the address start register 70. In addition, the address of the current record control word contained in the address A register 102, FIG. 7c, will be advanced by "one" under control of a "one upper" control circuit 103. As a consequence of the above, the first table word in the memory corresponding to the address specified in the address start register 70 will be issued from the memory.

The table word is issued from the memory by way of the information bus 20 to the arithmetic register 80. Thereafter, a comparison will be made betewen this table value and the search argument by means of the adder and comparing unit 30a. The table value in the arithmetic register is entered into the adder by way of a scanner 83, seen in FIG. 7b; line 84, output latch 85, seen in FIG. 7d; line 86, mix 87, switch 88, channel 1, entry B, 190b, to the adder 190. Concurrently, the search argument in accumulator #3, 160, is transmitted to the adder entry A by way of accumulator output line 161, seen in FIG. 7d; output latch 162, line 163, mix 164, channel 2, entry B, 190b, to the adder. Outputs from the latter are fed by way of lines 191 and 192 to the comparing unit 30a where an output will be manifested on either one of the three comparing outputs; namely, high, low, or equal. Since the search is directed to finding a high table value and the comparison yielded a low at this point, the operation then proceeds to call for the issuance from the memory of the next table value.

This next table value may or may not be the next consecutive sequential value depending upon the extent or degree of incrementation of the record control word address in the auxiliary register 30b. Address incrementation is effected by way of the adder as follows. The increment value in the program D register 100, FIG. 7c, is transmitted under control of switch 113, along line 103, in FIG. 7c; output latch 105, in FIG. 7d; line 106, diode mix 107, channel 2, address entry B, 190b, to the adder. Concurrently, the increment is regenerated in the program D register 100 under control of switch 108. At the same time the record control word start address is fed from the auxiliary register 30b to the adder by way of the line 54, in FIG. 7b; line 55, output latch 56, line 57, mix 67, switch 68, in FIG. 7d; channel 1, entry A, 190a, to the adder 190. The sum of these entries provides the incremented record control word start address and this passes from the adder output line 196, to line 197, switch 69, FIG. 7b; to the auxiliary register 30b. The incremented record control word start address in the auxiliary register 30b is compared against the stop address in the auxiliary register 30c. This is accomplished in the manner described by means of the adder 190 and the comparing unit 30a, shown in FIG. 7d. If the incremented value is found to be less than the value of the start address, the operation proceeds to call for the table value corresponding to the latest incremented address. The incremented address will next be read out of the auxiliary register 30b to the arithmetic bus 212 and from there to the address storage register 70 in the manner previously described. From the register 70, the address is transmitted to the computer address bus 211, from there to the memory register storage and selection means 2, to bus 3, and eventually to the memory 1. When the memory is available, the table value corresponding to the incremented address is issued to the arithmetic register 30 in the manner earlier described. This latest table value will then be compared with the search argument in the manner described, and the results of this comparison will then be evaluated as before. Should the comparison yield another low, the last incremented address will again be incremented and the operations previously described will again be repeated.

The operation will continue until either a high or equal table value is found, in which event the incremented record control word address is transferred to memory location 0098, or the operation yields a "no find" result upon completion of the search of the entire table, in which event the search is terminated. When the operation results in a "find," the incremented record control word address is transmitted to the memory location 0098 as follows. The first step involves the reading out of the contents of location 0098 to the auxiliary registers 30b and 30c by way of information bus 210, with positions 2–5 of the information blanked out in order to prevent the entry of this information into the auxiliary register 30b. Following this, the contents of the auxiliary registers 30b and 30c (30b containing the address of the found table value) is transmitted to memory location 0098 by way of information bus 210; the principal control gate for this operation is TLU CTRL gate D. Attending this operation, instruction counter 124, in FIG. 7c, is updated and the program routine of the computer thereafter is directed from the updated address in the instruction counter.

When, as earlier mentioned, the table is constituted of several tables scattered in the memory, each such scattered table has associated therewith a record control word including a sign. Each such record control word will have a plus sign except the last record control word which will have a minus sign. During the course of a table look-up operation, when the incremented record control word start address is compared with the stop address and found to be greater than the stop address, the operation then calls for interrogation of the record control word sign. If the sign is found to be plus, the operation calls for reading out the next record control word from the memory. However, if the sign is found to be minus, indicating the fact that the current record control word is the last one, the table look-up operation will be terminated if the search was directed to the finding of an equal or a high. However, if the search was directed to the finding of a low table value, the last incremented record control word address in the auxiliary register including contents, if any, previously transmitted thereto from the accumulator #2 will all be transferred to memory location 0098.

The sign of the record control word is interrogated in the record control word sign register 140, shown in FIG. 7a, which register issues a plus output on 141 or a minus output at 142 depending upon the sign contained in the sign register. The record control word sign is entered into the sign register 140 during transmission of the record control word by way of the information bus 210 to the auxiliary registers.

Figure 7D:
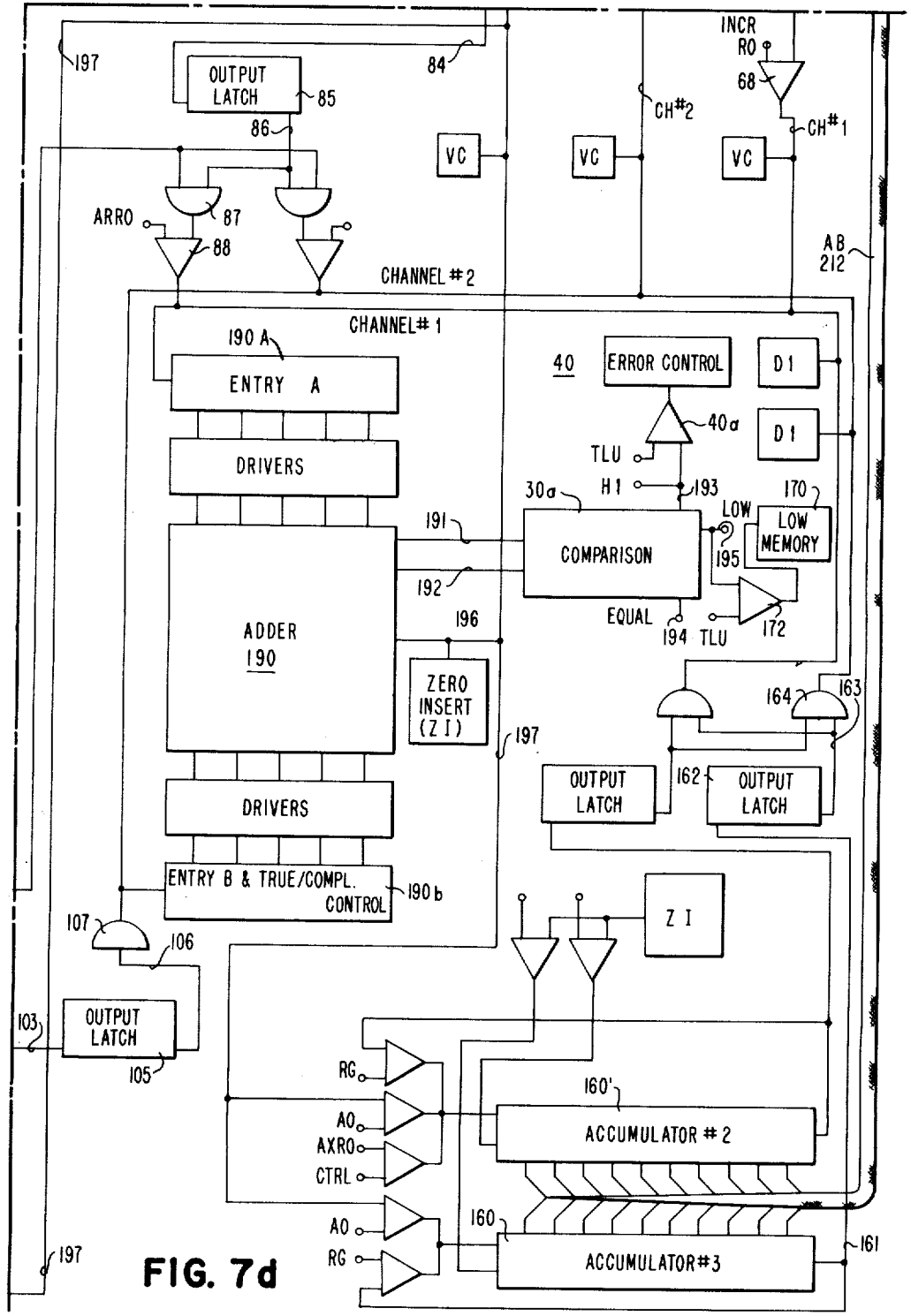

Table look-up low operation is initiated in much the same way as either a high or equal search, and the course of the search proceeds in the manner described to the point where the first low "find" is encountered. From this point on, the operation proceeds as follows. The address in the auxiliary register 30b, in FIG. 7b, is transferred by way of the arithmetic bus 212 to the accumulator #2, 160', in FIG. 7d. The address will also be retained in the auxiliary register by virtue of the fact that the regeneration controls will be effective during this transfer operation. The table value, corresponding to the address transferred, located in the arithmetic register 30, will be transferred by way of the arithmetic bus 212 to the accumulator #3, 160. In addition, the memory latch 170, in FIG. 7d, is turned on under the control of switch 172, to indicate the fact that a low table value has been found. At the end of the above operations, the low table value in accumulator #3 becomes the search argument for the ensuing table look-up low operations, and the address of this search argument will have been entered into accumulator #2 and regenerated in the auxiliary register 30b. The operation, from here on in, if the table search is not exhausted, will be in the manner described; i.e., the address in the auxiliary register 30b will be incremented and compared with the stop address in auxiliary register 30c. If the comparison indicates that the search operation is to continue, the next table value will be transmitted from the memory to the arithmetic register 80 and compared with the latest search argument in accumulator #3. This comparison operation is performed in the manner described. If the comparison yields another low "find," the address corresponding to this low table value and the table value are transferred, respectively, to the accumulators #2 and #3 in the manner earlier described. These operations are repeated each time a new low is found. At the end of the table search, the address of the lowest table value will be in accumulator #2 and the search argument in accumulator #3, the search argument corresponding to the lowest table value found. The address of the lowest table value will then be transmitted from accumulator #2 to the auxiliary register 30b. After which, table look-up termination operations will proceed in the manner described to transmit the address of the lowest found table value to memory location 0098.

It may be appreciated that, in a table look-up search operation in which an increment value greater than one is used and in which the entire table is constituted of several individual partitioned tables, the program routine may be set up to direct the course of the search in any desired manner; for example, in the case where the last incremented address value indicated that the table search had preceded beyond a value which could have been the found value. The program in this instance would then direct the course of the table look-up to return to the table portion containing the passed table value and then proceed on the basis of examining each succeeding table value on the basis that each address would be incremented by a value not greater than one. In this manner, the passed over table would then eventually be encountered.

It may also be appreciated that the search argument may be a 10-digit word or any portion of the word less than ten digits. The selection of the portion of a table word to be searched is under control of a field control code of an instruction and it is contained in the field control register 10c, shown in FIG. 7c. This register 10c, accordingly, issues appropriate signals over a line 9 connected to scanner 83, in FIG. 7b. This scanner, in response to the control signal, controls the issuance of the designated portion of the table word.

Comparison of the signs of the table value and the search argument is performed at the appropriate time of table look-up comparing operation. Entry of the table value sign into a sign latch 223, in FIG. 7b, is transmitted by way of a line 221 connected to the arithmetic bus 212. Entry of the search argument sign to a sign latch 226, in FIG. 7b, is by way of a line 220 connected to the arithmetic bus 212. The latch settings are then compared by means of a comparing unit 228 under control of switches 224 and 227.

Figure 9:
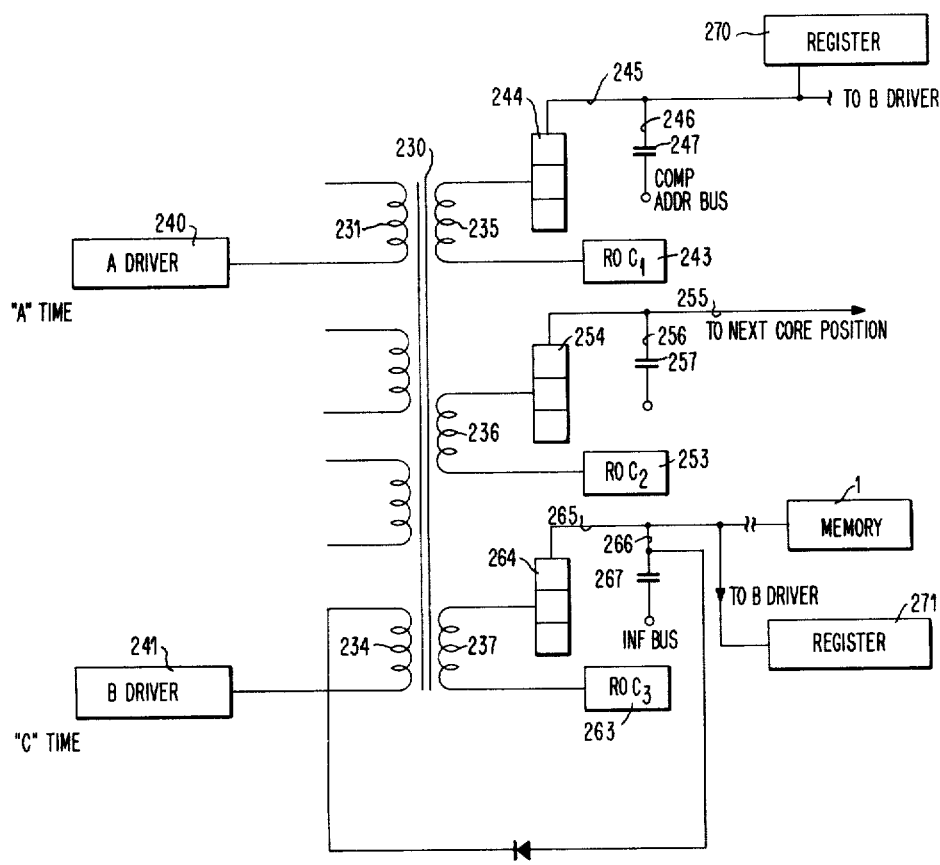
FIG. 9 is a fragmentary drawing of a portion of a register showing the principles of data transmission into and out of the register.

Data transmission in the system may be effected on either a parallel or serial basis. The data issued in parallel a word at a time from the memory to a bus is transmitted in a single memory cycle and from the bus to any other register a word at a time in another memory cycle. Transmission from any register to any other register may be issued parallelly by way of a connecting bus or the data may be transmitted serially from register to register a digit at a time. To explain the principle of data transmission, reference is invited to FIG. 9 which shows but a fragmentary portion of a core-type shift register and as much of the transmission facilities as is necessary to explain the principle of operation. The portion shown comprises a core 230 of magnetic material having substantially square loop characteristics. The core is threaded with windings; for example, 231-237. Windings 231 and 234 are connected, respectively, to associated drivers 240 and 241; the former being effective to energize its winding 231 at A pulse time and the latter at C pulse time. Winding 235 is connected to a readout control 243 and to a switching transistor 244. The latter is connected to a line 245 in turn feeding another register 270 and a computer address bus line containing a capacitor 347. Winding 236 is wound in a similar manner to a readout control 253 and a switching transistor 254, with the latter being connected to a line 255 in turn connected to another bus line 256 containing a capacitor 257. In like manner, winding 237 is connected to a readout control winding 263 and a switching transistor 264. The latter is connected to a line 265 which feeds an information bus line 266 containing a capacitor 267. In addition, the line 265 is connected to another register 271 and to a memory 1. The readout control means 243, 253 and 263 may be energized either singly or collectively to cause their associated capacitors to be charged. A charged capacitor indicates the presence of digit bit information and a discharged capacitor indicates the absence of information. Thus, to enter information, it would be necessary to charge the capacitor under control of its associated readout control means. To read out information, it would be necessary to discharge the capacitor.

Assuming that the information bus capacitor 267 is charged as a result of a data transfer from memory, by means not shown, the manner of entering information from the information bus to the register represented by the core 230 is as follows. When the B driver 241 is turned on, it provides a discharge path for the capacitor 267 by way of winding 234. This causes the core to switch from an initial "0" state to a "1" state. To transfer this stored information from the core to some other register; for example, 270, the capacitor 247 for this must be charged and this being accomplished by turning on readout control 243 and turning on the A driver 240 at A time. At A time, in response to the turned on A driver, winding 231 is energized to switch the core from its "1" state to a "0" state. This action provides a negative voltage on the winding 235 which permits the transistor 244 to conduct and thereby provide a charging path for the capacitor 247. To transfer the stored energy from the capacitor 247 to the register 270, the B driver in the register must be turned on and the transfer accomplished as described.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing system having a storage device capable of storing a plurality of groups of data manifestations representing numerical quantities wherein each of said groups of data manifestations is associated with a unique address, table look-up apparatus for locating the address associated with the group of data manifestations which represents the lowest numerical quantity consisting of:

a first address register capable of storing address information;

selective read out means connected to said first address register for selectively reading out a group of data manifestations from said storage device under control of the address information stored in said first address register;

a first data register connected to said storage device for receiving the group of data manifestations read out from said storage device under control of said selective read out means;

a second data register capable of storing a group of data manifestations representing a numerical quantity;

a first comparator connected to said first data register and said second data register for comparing data manifestations stored in said first data register with the data manifestations stored in said second register, said first comparator having a:

first output which is energized each time a comparison is effected by said comparing means, and a second output which is energized when the data manifestations stored in said first data register represent a numerical quantity smaller than the numerical quantity represented by the data manifestations stored in said second data register;

means including a plurality of gates operated by said second output of said first comparator, to transfer the data manifestations stored in said first data register to said second data register;

means including a plurality of gates operated by said second output of said first comparator to transfer the address information stored in said first address register to a second address register;

an adder operated by said first output from said first comparator to add a predetermined quantity to the address information stored in said first address register when said first output is energized;

a third address register containing predetermined address information;

a second comparator connected to said first address register and said third address register, said second comparator having a:

first output which is energized when the address information stored in said first address register represents a numerical quantity which is smaller than the numerical quantity represented by the address information stored in said third address register;

and a second output which is energized when the address information stored in said first address register represents a numerical quantity which is equal to or greater than the numerical quantity represented by the address information stored in said third address register;

means connecting said first output of said second comparator to said storage read out means to actuate said storage read out means when said first output of said second comparator is energized;

and an indicator connected to said second output of said second comparator to indicate that the address associated with the group of data manifestations representing the lowest numerical quantity is stored in said second address register.

2. In a data processing system having a storage device capable of storing a plurality of groups of data manifestations representing numerical quantities wherein each of said groups of data manifestations is associated with a unique address, table look-up apparatus for locating the address associated with the group of data manifestations which represents the lowest numerical quantity consisting of:

an AND gate;

four control gates, each of said control gates having an input, a primary output, and a secondary output; the operation of said control gates being characterized by the appearance of a pulse signal at said primary output when a pulse signal is applied to said input, and further characterized by the appearance of a pulse signal at said secondary output when the pulse signal appearing at said primary output terminates;

the first of said control gates adapted to receive at its input a pulse signal for initiating the operation of the table lookup apparatus;

the input of the second of said control gates connected to the secondary output of said first control gate and to the output from said AND gate;

the secondary output of said second control gate connected to the inputs of the third and fourth control gates;

and the secondary output of the third control gate being connected to one input of said AND gate;

a first address register;

a second address register;

means responsive to the primary output signal from said first control gate for storing address information into said first and second address registers;

selective read out means connected to said first address register for selectively reading out a group of data manifestations from said storage device under control of the address information stored in said first address register in response to the primary output signal from said second control gate;

a first data register connected to said storage device for receiving the group of data manifestations read out from said storage device under control of said selective read out means;

a second data register capable of storing a group of data manifestations representing a numerical quantity;

a first comparator connected to said first data register and said second data register for comparing data manifestations stored in said first data register with the data manifestations stored in said second data register in response to the primary output signal from said second control gate, said first comparator having an output which is energized when the data manifestations stored in said first data register represent a numerical quantity smaller than the numerical quantity represented by the data manifestations stored in said second data register;

means including a plurality of gates operated by said second output of said first comparator, to transfer the data manifestations stored in said second data register;

a third address register;

means including a plurality of gates operated by said second output from said first comparator and said primary output from said fourth control gate to transfer the address information stored in said first address register to said third address register;

means responsive to the primary output signal from said third control gate for incrementing by a predetermined amount the address information stored in said first address register;

a second comparator connected to said first address register and said second address register in response to the primary output signal from said third control gate, said second comparator having a first output which is energized when the address information stored in said first address register represents a numerical quantity which is smaller than the numerical quantity represented by the address information stored in said second address register, said first output being connected to an input of said AND gate;

and a second output which is energized when the address information stored in said first address register represents a numerical quantity which is equal to or greater than the numerical quantity represented by the address information stored in said second address register;

and an indicator connected to said second output of said second comparator to indicate that the address associated with the group of data manifestations representing the lowest numerical quantity is stored in said third address register.

References Cited in the file of this patent
UNITED STATES PATENTS 2,782,398    West et al.  ---------- Feb. 19, 1959
2,885,659    Spielberg  ------------ May 5, 1959

OTHER REFERENCES

Publication I: IBM Ramac 305, Technical Manual, Copyright 1957.

Publication II: Handbook of Automation, Computation and Control, vol. II, by Grabbe, Ramo and Wooldridge, chapters 2 and 3, especially pp. 2-142 and 3-09 relied on.